Figure 1:
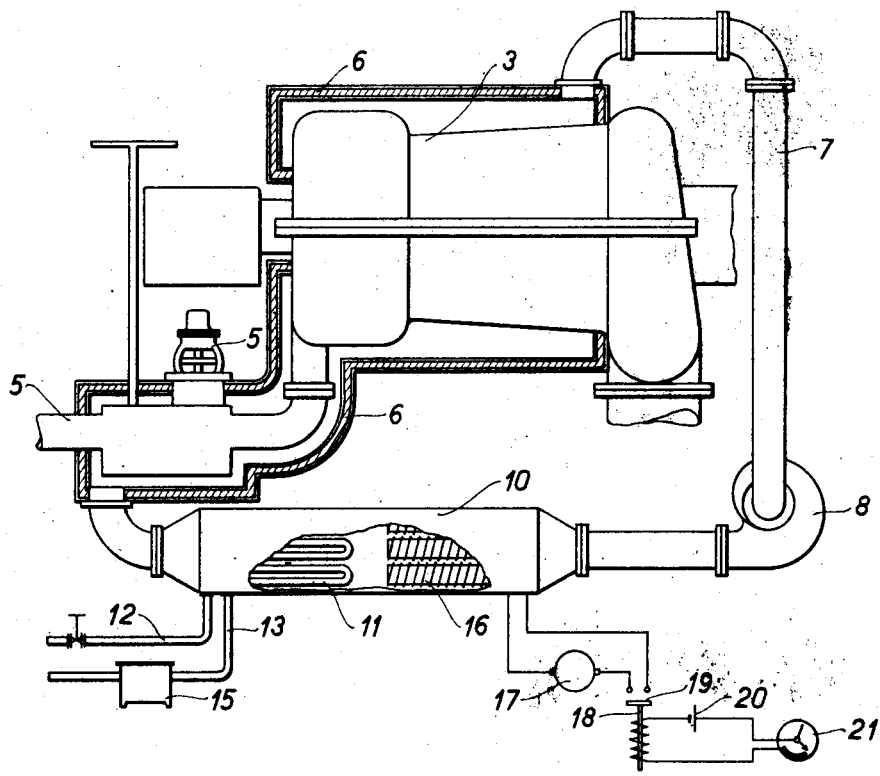

July 1, 1930.  E. BROWN  1,768,975

TURBINE HEATING SYSTEM

Filed May 23, 1929

Inventor
Eric Brown
By (signature)
Attorney

Patented July 1, 1930

1,768,975

UNITED STATES PATENT OFFICE

ERIC BROWN, OF BADEN, SWITZERLAND, ASSIGNOR TO A. G. BROWN BOVERI & CIE., OF BADEN, SWITZERLAND, A JOINT-STOCK COMPANY OF SWITZERLAND

TURBINE HEATING SYSTEM

Application filed May 23, 1929, Serial No. 365,334, and in Germany June 6, 1928.

This invention relates to improvements in systems for heating and maintaining turbines in preheated condition to facilitate the starting thereof and, more particularly, to means for controlling the supply of a heating medium thereto in dependence on the time at which such turbine is to be put into operation.

The time required for starting a turbine from standstill, in such manner as to avoid producing stresses and strains in the material due to the sudden heating thereof, varies according to the size of the machine and the temperature of the operating medium supplied thereto. Less time, however, is required to heat the turbine to operating temperature if the turbine is surrounded, in spaced relation, by a casing and a heating medium is passed through the space between the casing and turbine. The turbine may thus be maintained in such heated condition as to materially decrease the time required for placing the same into operation. It is, therefore, possible to utilize a turbine as a reserve machine to take the load wherever required.

If the source of heat to be utilized is steam, the temperature obtainable is limited by the saturation temperature of the steam. Such saturation temperature is usually insufficient to heat the walls of the turbine to such temperature as to prevent surface condensation on the walls thereof and to avoid stresses in the material when the turbine is put into operation. It is accordingly necessary that some means be provided whereby the temperature of the heating medium may be raised beyond the saturation temperature of the heating steam. The most practicable of such means is heating by use of electric current which is, however, relatively expensive as compared with steam heating.

Arrangements may, however, be made for cooperatively using both steam and electric heating in which arrangements steam is used to maintain the temperature at substantially the required value and electric heating is used only to bring the temperature to the full operating value immediately before starting the turbine.

It is, therefore, among the objects of the present invention to provide a system whereby a turbine may be maintained in such preheated condition as to permit the turbine to be used as a momentarily available reserve machine.

Another object of the invention is to provide a system in which steam heating and electric heating are used in combination to raise a heating medium to such temperature as will be required to maintain a turbine in the heated condition necessary to starting.

A further object of the invention is to provide a system in which the electric heating elements of the system are supplied with electric current only during the period immediately before the time at which the turbine is to be put into operation to supply power necessary to carry the peak of a load.

Figure 2:
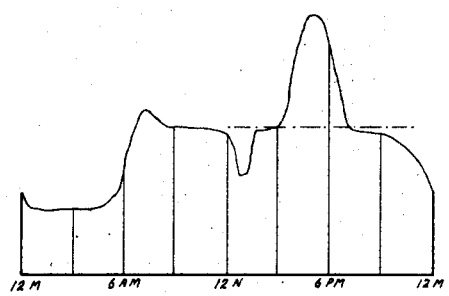

Objects and advantages other than those above set forth, will be apparent from the following description and the drawing in which Figure 1 is an elevational view, partially in cross-section, of an embodiment of the present invention, and Fig. 2 is a curve showing the period at which the usual peak occurs in a daily combined electric lighting and industrial electric power load and during which it is necessary to provide additional machines to carry the load.

Referring more particularly to the drawing by characters of reference, reference numeral 3 indicates a turbine connected with the usual control valve gear 5 both of which structures are enclosed by a casing 6, formed of heat insulating material, which is arranged in spaced relation about the valve gear and the turbine.

The end of casing 6 adjacent the exhaust end of turbine 3 is connected by a conduit 7 with a blower 8. The blower 8 is connected with a heat exchanger 10 which is connected with one end of the portion of casing 6 surrounding the valve gear 5. It will be seen that a closed circuit is thus formed for the circulation of a heating medium about the valves and the turbine. Such circulation is maintained by the blower 8 which forces the heating medium to circulate through the system.

The heat exchanger 10 is equipped with heating coils 11, arranged in one end thereof, through which steam flows continuously and which are supplied from a suitable source of steam (not shown) through a supply line 12 and are exhausted through an exhaust line 13 to a trap 15. The heat exchanger is provided, at the end opposite the steam heating coils 11, with a plurality of electric heating elements 16 which are connected to a source of current 17. The supply of electric energy to the heating elements 16 is controlled by a relay 18 operating a switch 19 which relay is actuated by current from a source of current 20 when the circuit to the relay 18 is closed by a contact making and breaking clockwork 21. The clockwork 21 is provided with a contact member so arranged that the circuit to the relay 18 will be closed for a predetermined period before the time at which the turbine is to be put into operation. Such period may readily be determined from the characteristics of the turbine and the daily load curve, such as is shown in Fig. 2, which indicates the period during which the peak load occurs.

When the circuit including relay 18 is closed, switch 19 will be closed and current is supplied to heating elements 16. The amount of heat available for raising the temperature of the fluid circulating through the system is thus increased and the turbine may be brought to operating temperature very quickly. The heat required for maintaining the heating medium circulated through the space between the casing of the turbine by the blower, at approximately the operating temperature for the turbine, is supplied from steam flowing continuously through heating coils 10 and the relatively expensive electric heating energy is applied only during the period at which the turbine is to be heated exactly to the operating temperature.

Although but one embodiment of the invention has been illustrated and described, it will be understood that various other embodiments are possible, and that various changes may be made without departing from the spirit of the invention or the scope of the claims.

The invention claimed is:

1. In a system for maintaining a turbine at substantially the operating temperature, a casing surrounding the turbine, a heat exchanger connected with said casing, means for causing a circulation of heating medium through said casing and said heat exchanger connected therebetween, and means for supplying heat energy to said heat exchanger during a predetermined period prior to starting the turbine.

2. In a system for maintaining a turbine in heated condition to facilitate the starting thereof, a casing surrounding the turbine for retaining and guiding the flow of a heating medium thereabout, a steam heated heat exchanger connected with said casing, means connected with said casing and said heat exchanger for causing a circulation of heating medium therethrough, and means for supplying additional heat energy to said heat exchanger during a predetermined period prior to starting the turbine.

3. In a system for maintaining a turbine in heated condition to facilitate the starting thereof, a casing surrounding the turbine for retaining and guiding the flow of a heating medium thereabout, a steam heated heat exchanger connected with said casing, a blower connected with said casing and said heat exchanger for causing a circulation of heating medium therethrough, electric heating elements arranged within said heat exchanger, and means for supplying electric energy to said heating elements during a predetermined period of time prior to starting the turbine.

4. In a system for maintaining a turbine in heated condition to facilitate the starting thereof, a casing surrounding the turbine for retaining and guiding the flow of a heating medium thereabout, a steam heated heat exchanger connected with said casing, a blower connected with said casing and said heat exchanger for causing a circulation of heating medium therethrough, electric heating elements arranged within said heat exchanger, and means for controlling the supply of electric energy to said heating elements in dependence on the time set for starting the turbine.

5. In a system for facilitating the starting of a turbine by maintaining the same in heated condition, a heat insulating casing arranged about the turbine is spaced relation thereto for retaining and guiding a heated fluid thereabout, a heat exchanger continuously supplied with heating steam and connected with said casing, a blower connected with said casing and said heat exchanger for circulating a heating fluid therethrough, electric heating elements arranged within said heat exchanger, and means for intermittently supplying electric energy to said heating elements in dependence on the peak loads to be carried by the turbine to increase the heat available for transfer to the heating medium.

In testimony whereof I have hereunto subscribed my name this 10th day of May, A. D. 1929.

ERIC BROWN.